March 22, 1955
C. J. BISHOFBERGER ET AL
ELECTRIC MOTOR POSITIONING SYSTEM
WITH REMOTE CONTROL LIMIT SETTING
Filed Aug. 3, 1951
2,704,819
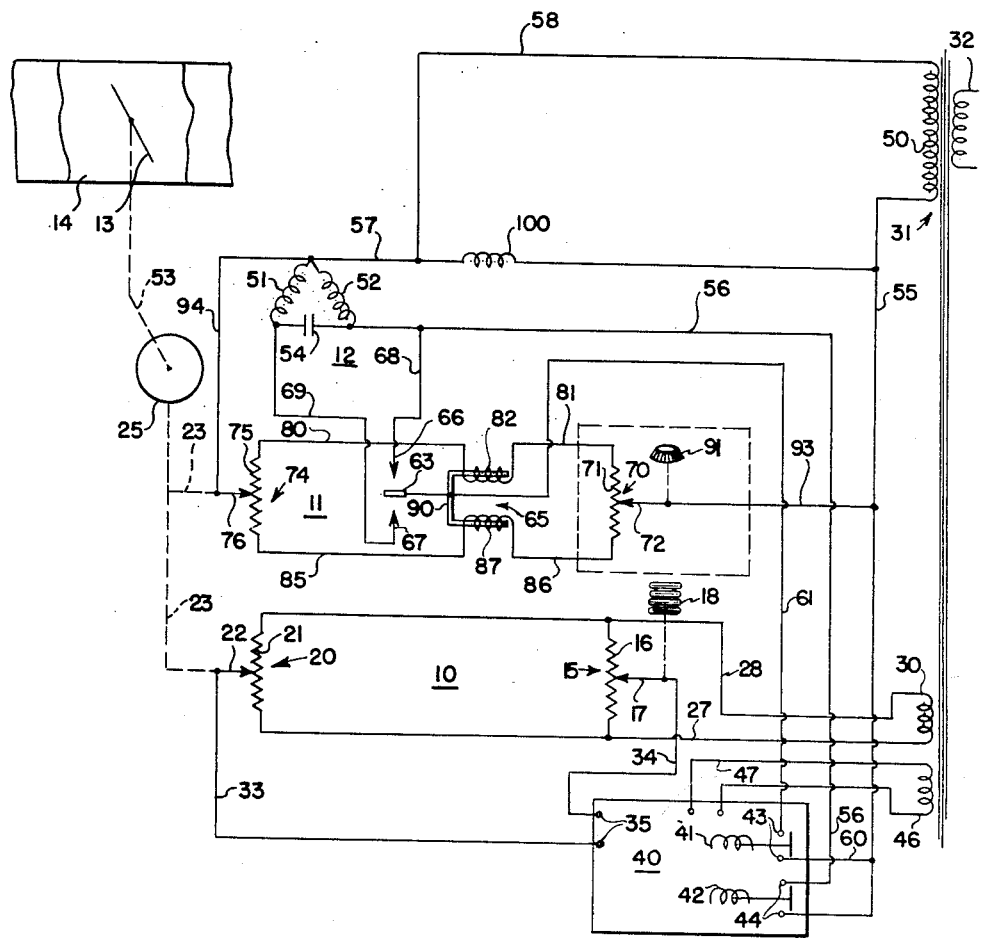
INVENTORS
CARL J. BISHOFBERGER
BY RALPH L. ALLEN
George H. Fisher
ATTORNEY United States Patent Office 2,704,819
Patented Mar. 22, 1955

2,704,819

ELECTRIC MOTOR POSITIONING SYSTEM WITH REMOTE CONTROL LIMIT SETTING

Carl J. Bishofberger, Minneapolis, and Ralph L. Allen, Golden Valley, Minn., assignors to Minneapolis-Honeywell Regulator Company, Minneapolis, Minn., a corporation of Delaware Application August 3, 1951, Serial No. 240,214

11 Claims. (Cl. 318—29)

Our invention relates to remote control positioning systems and more particularly to a system of this type in which a position limiting control is exercised on an object to be remotely positioned. Therefore, we describe our apparatus as a remote control position limiting system.

The control of a device from a remote point is well known in the art, particularly where the controller is a condition responsive or a manually operated means. Further, the control of an object or device from more than one point or by more than one controller in the same network is recognized as also old in the art. The present apparatus provides for the limiting of the position of an object to be controlled from a remote point by a second control circuit which is independent electrically and mechanically of the first named or primary control circuit and primary controller at the remote point. As will be hereinafter described, the limiting function is one direction of movement of the remotely controlled device or object and the primary controller always remains in authority. Such an apparatus has innumerable applications, and we have found it of particular advantage for application in air conditioning systems where intake air volume is controlled by a damper, the damper in turn being controlled by a primary balanceable network in which a room thermostat serves as a primary controller. It is of particular advantage to limit the closed limit position of the damper with variations in the temperature of the outside air and this is provided in the subject invention by an independent and secondary controlling circuit which may be manually or automatically controlled also from a remote point. It is therefore an object of this invention to provide an improved remote control positioning apparatus in which the position of the device or object to be positioned is adjustably limited from a remote point.

It is also an object of this invention to provide a simplified control apparatus of this type which is economical to manufacture, install, and maintain. These and other objects of this invention will become apparent from a reading of the attached description together with the drawing which is a schematic disclosure of our invention.

The remote control position limiting apparatus of the subject invention includes a primary control circuit or network 10, a secondary control circuit or network 11, an actuator or motor 12 controllably energized by said primary and secondary controlling circuits, and a device 13 driven by said motor to be remotely positioned in accordance with the control exercised on the same by said primary and secondary controlling circuits. The device 13 to be positioned is shown herein as a damper located in an air duct 14 and operated by the motor 12 such as to be variably positioned within said duct to control the volume of air flow therethrough.

The primary control circuit 10 of the remote control position limiting apparatus includes a temperature sensing potentiometer 15 having a winding 16 and a wiper 17 which is operated by a temperature sensing element 18. The potentiometer 15 is connected in parallel with a balancing potentiometer 20 having a winding 21 and a wiper 22 which wiper is mechanically connected by means of a connection 23 to a rotor 25 of the motor or actuator 12. This primary control circuit is in the form of a conventional Wheatstone bridge which is energized by conductors 27, 28, connected to a secondary winding 30 of a transformer 31 whose primary winding 32 is energized from an alternating current source of power. The output circuit of this bridge or primary control circuit is impressed upon conductors 33, 34 connected respectively to wipers 22 and 17 of the balancing and sensing potentiometers of this bridge and in turn are connected to input terminal 35 of an amplifier 40. Amplifier 40 is shown in block form with the details of the amplifier being omitted. However, the amplifier may be of any conventional type in which one or the other of two output circuits is energized depending upon the phase of the input signal. A typical amplifier of this type is shown in the patent to Albert P. Upton No. 2,423,534 dated July 8, 1947. In such an amplifier, one or the other of a pair of discriminating relays 41, 42 are operated by the amplifier depending upon the phase of the input signal. In the present disclosure only the relays 41, 42 are shown with a pair of contacts 43, 44 operated thereby. A secondary winding 46 of transformer 31 is connected to the amplifier 40 by means of conductors 47 to supply the amplifier with an A. C. source of power. The discriminating relays 41, 42 of amplifier 40 and their associated contacts 43, 44 will be hereinafter referred to as close and open relays, respectively, indicating the direction of energization of the motor to obtain a desired rotation of the motor and hence the desired operation of the damper toward the closed and opened positions.

As heretofore noted, the primary control circuit through its sensing and balancing potentiometers 15 and 20 respectively control the energization of motor 12 to drive the damper to an open or closed position or intermediate positions thereof depending upon the relative positions of the wipers 17 and 22 on the sensing and balancing potentiometers. The motor 12 is energized from a secondary winding 50 of transformer 31 through one or the other of the discriminating relays 41, 42 in a manner hereinafter described. Motor 12 is disclosed herein as a conventional two phase condenser or induction motor having two windings 51, 52 which serve alternately as line and condenser phase windings depending upon which of the two energizing circuits to the windings is rendered effective. Although not shown in the drawing, the rotor 25 is of the conventional squirrel cage type and is connected through a conventional speed reducing gear train (not shown) to the damper by means of a shaft 53 and to the balancing potentiometers by means of shafts or connections 23. The energization circuit for the motor 12 through the opening relay 42 of amplifier 40 is as follows: secondary winding 50 of transformer 31 to conductor 55, contacts 44 of relay 42 to conductor 56, winding 52 of motor 12 to conductors 57 and 58 to the other extremity of secondary winding 50 for one phase of the induction motor. The second phase is energized from conductor 56 through a condenser 54 and winding 51 to conductors 57 and 58 leading to transformer winding 50. This circuit will cause the motor to be energized in such a direction that the damper will be operated toward the open position. Upon unbalance of the sensing or primary control bridge 10 in the opposite direction causing the operation of relay 41 or the closed relay, motor 12 will be energized through the following circuit: secondary winding 50 of transformer 31, conductor 55, conductor 60, contacts 43 of close relay 41, conductor 61, to a movable contact 63 of a differential relay 65 of the secondary control circuit 11, to one or the other of the stationary contacts 66, 67 of differential relay 65, conductors 68 or 69, to windings 51, 52 of motor 12 to conductor 57 and 58 to the other extremity of secondary winding 50. It will be seen that depending upon the position of the movable contact 63 of differential relay 65 that the motor 12 will be energized for one or the other direction of rotation even though the closed winding or relay 41 of the amplifier is energized. The reasons for this circuit will become obvious as the disclosure proceeds.

The secondary controlling circuit or position limiting circuit 11 is comprised of a manually operated potentiometer 70 having a winding 71 and a wiper 72, and a second follow up potentiometer 74 having a winding 75 and a wiper 76 which is operatively connected to the shaft 23 driven by the rotor 25. The potentiometer windings 71 and 75 are connected at one extremity by conductors 80 and 81 to a coil 82 of the differential relay 65 and at the other extremity by conductors 85, 86 to a second winding 87 of the differential relay 65. Cooperating with the coils 82 and 87 of the differential relay is a U-shaped armature 90 which is differentially attracted by the energization of the coils 82, 87 to operate the movable contact 63 toward and away from the fixed contacts 66, 67 of the relay to provide a circuit through one or the other of the fixed contacts 66, 67. The wiper 72 of the manually operated potentiometer has a knob 91 attached thereto for the purpose of positioning the wiper along the winding 71 of the potentiometer. The secondary controlling circuit is a modified bridge circuit which is energized through the wipers 72, 76 of the manually operated and balanced potentiometers respectively in the following circuit: secondary winding 50 of transformer 31 to conductor 55, conductor 93 to wiper 72 of potentiometer 70, through conductors 81 and 86 to relay coils 82, 87, conductors 80, 85 to wiper 76 of potentiometer 74, through wiper 76 to conductor 94, and conductors 57 and 58 to secondary winding 50. It will be seen that depending upon the relative positions of the potentiometer wipers on the respective windings that one of the relay coils will be energized more than the other to cause the armature 90 to move the contact 63 toward one or the other of the stationary contacts 66, 67.

Also included in the motor energization circuit is a solenoid brake coil 100 which is connected across the transformer secondary 50 to conductors 55, 58 such that it will be continuously energized whenever power is supplied to the primary winding of transformer 31. This solenoid brake coil is designed as a failsafe device to release the brake of the motor 12 upon power failure. Reference is made to the Edelman et al. Patent No. 2,445,658, dated July 20, 1948, in which a detailed disclosure of the motor 12 with its associated clutch and brake mechanisms together with the failsafe solenoid is had. For the purposes of the present disclosure, however, it is sufficient to note that the subject motor and brake which forms no part of this invention is of the type indicated in the above named patent in which the motor is clutched to its gear train whenever the motor is energized and moved to a braked position whenever the motor is deenergized. The solenoid coil 100 being continuously energized maintains a brake releasing mechanism inoperative until power to the transformer fails. At such a time the brake release mechanism becomes operative to disengage the brake which is normally operated when the motor is deenergized.

The remote control limit positioning system for apparatus of the subject invention has been described in connection with the damper of an air conditioning system but it is to be understood that any device may be positioned thereby in which it is desired to limit one direction of movement thereof.

In operation, the primary controlling circuit or bridge 10 is largely conventional and exercises primary control over the operation of motor 12. The potentiometers 15 and 20 which are the sensing and balancing potentiometers, respectively, form a Wheatstone bridge which is energized by the secondary winding 30 of transformer 31 with the output circuit or output being taken from the wipers 17 and 22 of the respective potentiometers. While not specifically stated it is to be understood that the condition responsive means which is shown as a temperature sensitive bellows 18 may be remotely positioned within the space which it is desired to air condition or it may be so positioned to sense outside air. In either instance, a variation in temperature will cause the sensing element 18 to respond moving the wiper 17 on its winding 16 to unbalance the bridge circuit. This unbalance, depending upon magnitude and sense, will energize the amplifier 40 and cause one or the other of the relays 41, 42 to operate closing an energizing circuit for the actuator 12 previously described. Assuming that the relay 42 would be operative indicating a call for open operation of the damper, the motor 12 would be energized through the circuit described above. This energization circuit of the motor is conventional and does not include the differential relay 65 from the secondary controlling circuit or bridge. The energization of this motor causes rotation of the damper and at the same time moves the balancing potentiometer wiper 22 along the winding 21 of the balancing potentiometer 20 to rebalance the bridge circuit. A reversal of direction of the movement of the wiper 17 on the winding 16 of sensing potentiometer 15 caused by an increase in heat, for example, would cause relay 41 or the close relay of the amplifier to operate setting up the energizing circuit for the motor through the differential relay 65 as previously described. Assuming that the manual adjustment knob has been set for a desired closed limit position of the damper motor, the secondary control circuit would normally be unbalanced and the relay operated such that the movable contact 63 would be engaged with contact 67. Thus with the relay 41 energized, the energizing circuit for the motor would be as follows: secondary winding 50 of transformer 31, conductor 55, conductor 60, contacts 43 of relay 41, conductor 61, to movable contact 63 of relay 65, contact 67, conductor 69, and winding 51 to conductors 57 and 58 through one phase of the motor and condenser 54 and winding 53, through the other phase of the motor windings and through conductors 57 and 58 back to the secondary winding 50. This would cause the damper motor or actuator 12 to rotate in the closed direction until the follow up potentiometer or balancing potentiometer 74 of the secondary circuit reaches a balanced condition with the manually operated potentiometer 70. Simultaneously with this operation, the balancing potentiometer of the primary control circuit would be operated toward a new balanced condition determined by the position of wiper 17 of sensing potentiometer 15. Depending upon the previous movement of wiper 17 to initiate this closing operation, it may be that the sensing or primary bridge circuit would be balanced before the relay 65 becomes operative, in which case the relay 41 would be deenergized and the motor energization broken at the relay contact 43. This condition would arise when the motor would have operated but would not have reached the closed limit position. Assuming, however, that a wide change in temperature has taken place and the secondary controlling circuit reaches a balanced condition, that is its wiper 76 moves to a position on winding 75 corresponding to the position of wiper 72 on winding 71, the differential relay would be deenergized and the energization circuit for the motor in the closed direction broken at the contacts 63, 67 defining the limiting operation. Thus, even though the sensing or primary control circuit would not be satisfied or balanced the motor would be deenergized and remain deenergized, being limited by the secondary control circuit.

Should it be desired under the circumstances described above to change the limit position, the manual operator 90 may be adjusted such as to again remake the contacts 63, 67 and assuming that the closed relay is still energized the motor would operate again toward the closed position until a balanced condition arises in either the primary or secondary controlling circuits.

On the other hand, should it be desired to move the closed limit position of the damper further toward the open position or that is to open the damper still further even though the primary control circuit is calling for operation of the damper toward the closed position, the manual knob 90 may be adjusted to position the wiper 72 on winding 71 such as to unbalance the secondary control circuit or bridge in the opposite direction causing the differential relay 65 to operate to make the contacts 63, 66 through a greater energization of coil 82 than is present at coil 87. It will thus be seen that the motor 12 under these conditions will be energized with the winding 52 being connected directly to transformer secondary 50 while winding 51 will be energized through the condenser 54 in a circuit as follows: secondary winding 50, conductor 55, conductor 60, contacts 43 of relay 41, conductor 61, movable contacts 63 to stationary contact 66 of differential relay 65, conductor 68, to winding 52 and conductors 57, 58 to secondary winding 50 and through the condenser 54, winding 51 and conductors 57, 58 to the secondary winding 50 of transformer 31. This will cause the motor or actuator coil to operate toward the open position even though the closed relay 41 of amplifier 40 has been operative in the primary controlling circuit indicating a demand for closing operation of the damper. When the wiper 76 on winding 75 reaches the balanced condition corresponding to the new position of wiper 72 on winding 71 the differential relay will again be balanced and the actuator 12 deenergized by the movement of the movable contact 63 of relay 65 to its neutral or balanced position.

Thus it can be seen that while the main or primary controlling circuit exercises primary control over the operation or the device to be remotely positioned, that the secondary circuit 11 which is controlled by the manually operated potentiometer 70 may modify the energizing circuit for the motor 12 through the discriminating relays 41, 42 of amplifier 40 to define variable or adjustable limit positions in the operation of the motor 12. It will also be seen that the effectiveness of the secondary controlling circuit is dependent upon the operation of the primary controlling circuit as the primary controlling circuit always retains control.

In considering our invention it should be kept in mind that this disclosure is intended to be illustrative only and the scope of the invention is to be determined only by the appended claims.

We claim as our invention:

1. In a remote control position limiting system, a device to be remotely positioned, an actuator for positioning said device, a primary controlling circuit including a primary controller in accordance with which said device is to be positioned, first relay means controlled by said primary controlling circuit and adapted to control in one position the energization of said actuator, a secondary controlling circuit including a secondary controller adapted to adjustably limit the operation of said actuator, a second relay means controllably energized by said secondary controlling circuit, said first relay means in a second position being connected to said second relay means and controlling with said second relay means said actuator to limit the position of said device in accordance with the adjustment of said secondary controller.

2. In a remote control position limiting system, a device to be remotely positioned, an actuator for positioning said device, a primary controlling circuit including a primary controller in accordance with which said device is to be positioned, first relay means controlled by said primary controlling circuit and adapted to control in one position the energization of said actuator, a secondary controlling circuit including a secondary controller adapted to adjustably limit the operation of said actuator, a second relay means controllably energized by said secondary controlling circuit, said first relay means in a second position being connected to said second relay means and controlling with said second relay means said actuator to limit the position of said device in accordance with the adjustment of said secondary controller, and first and second follow up controllers driven by said actuator in accordance with the operation thereof and included respectively in said primary and secondary controlling circuits.

3. In a remote control position limiting system, a device to be remotely positioned in response to a condition, an actuator for positioning said device, a condition responsive means, a primary controlling circuit including a potentiometer actuated by said condition responsive means, first relay means controlled by said primary controlling circuit and adapted to control in one position the energization of said actuator, a secondary controlling circuit including a manually positioned potentiometer adapted to adjustably limit the operation of said actuator, a second relay means controllably energized by said secondary controlling circuit, and means connecting said first relay means in a second position to said second relay means and said actuator, said first relay means in said second position controlling with said second relay means said actuator to limit the positioning of said device in accordance with the operation of said manually adjusted potentiometer.

4. In a remote control position limiting system, a device to be remotely positioned in response to a condition, an actuator for positioning said device, a condition responsive means, a primary controlling circuit including a potentiometer actuated by said condition responsive means, first relay means controlled by said primary controlling circuit and adapted to control in one position the energization of said actuator, a secondary controlling circuit including a manually positioned potentiometer adapted to adjustably limit the operation of said actuator, a second relay means controllably energized by said secondary controlling circuit, means connecting said first relay means in a second position to said second relay means and said actuator, said first relay means in said second position controlling with said second relay means said actuator to limit the positioning of said device in accordance with the operation of said manually adjusted potentiometer, and first and second follow up controllers driven by said actuator in accordance with the operation thereof and included respectively in said primary and secondary controlling circuits.

5. In a control circuit of the type described, in combination, an actuator, a balanceable primary controlling circuit adapted to control the energization of said actuator for reversible operation between predetermined limiting positions, a secondary controlling circuit including a manually operated controller and a follow-up controller operated by said actuator, and means connecting said secondary controlling circuit to said primary controlling circuit in accordance with a condition of unbalance of said primary controlling circuit to vary one of said predetermined limiting positions of said actuator for one direction of operation in accordance with the adjustment of said manual controller.

6. In a remote control circuit of the type described, in combination, an actuator, a primary controlling circuit including a relay means adapted to control the energization of said actuator for reversible operation between predetermined limiting positions, a secondary controlling circuit including a manually operated controller and a second relay means, and means including said second relay means and operative upon operation of said first relay means for varying one of said predetermined limiting positions of said actuator for one direction of operation thereof in accordance with the adjustment of said manual controller.

7. In a remote control position limiting system, a device to be remotely positioned, an actuator for positioning said device, a primary controlling circuit, an energy transmission circuit for energizing said actuator and controlled by said primary controlling circuit, and a balanceable secondary controlling circuit including an electrical controller and a follow-up controller operated by said actuator, said electrical controller being operative to modify the effect of said energy transmission circuit to said actuator in accordance with a condition of unbalance of said secondary controlling circuit.

8. In a remote control position limiting system, a device to be remotely positioned, an actuator for positioning said device, a primary controlling circuit, an energy transmission circuit for energizing said actuator and controlled by said primary controlling circuit, a balanceable secondary controlling circuit including an electrical controller, said electrical controller being operative to modify the effect of said energy transmission circuit to said actuator in accordance with a condition of unbalance of said secondary controlling circuit, and means included in said primary and secondary controlling circuits and operated by said actuator for balancing said primary and secondary controlling circuits.

9. In a remote control position limiting system, a device to be remotely positioned, an actuator for positioning said device, a primary controlling circuit, an energy transmission circuit for energizing said actuator and controlled by said primary controlling circuit, a balanceable secondary controlling circuit including an electrical controller and a follow-up controller operated by said actuator, and manual means attached to said electrical controller for varying the balance of said secondary controlling circuit, said electrical controller being operative to modify the effect of said energy transmission circuit to said actuator in accordance with the condition of unbalance of said secondary controlling circuit.

10. In remote control position limiting apparatus, an actuator for positioning a device, a primary controlling circuit including a primary controller in accordance with which the device is to be positioned, first relay means controlled by said primary controlling circuit, motor controlling means including said first relay means for controlling the energization of said actuator, a secondary controlling circuit including a secondary adjustable controller for adjustably limiting the operation of said actuator, said secondary controlling circuit including a second relay means controllably energized by said secondary circuit, and means connecting said second relay means to said motor controlling means in such a manner that when said first relay means is in one position, its control of said actuator is limited by said second relay means so that the position of the device is limited in accordance with the adjustment of said adjustable secondary controller.

11. In a motor controlling apparatus, a motor, a first balanceable network comprising a primary controller and a follow-up controller, motor controlling means connected to said balanceable network and to said motor for controlling said motor in accordance with the unbalance of said network, means for driving said follow-up controller by said motor to tend to restore the balance of said network so that said motor is normally positioned in accordance with changes in said primary controller, limit switch means connected to said motor controlling means for interrupting operation of said motor, a second balanceable network comprising a follow-up controller and an adjustable limiting position controller, means for driving said follow-up controller of said second network from said motor so that said second network is balanced when the motor position corresponds to the position of said limiting position controller, and means for actuating said limit switch means in accordance with the balance of said second network.

References Cited in the file of this patent

UNITED STATES PATENTS

| | | |
|---|---|---|
| 1,725,600 | Sperry | Aug. 20, 1929 |
| 2,135,991 | Nessell | Nov. 8, 1938 |
| 2,248,350 | Hill | July 8, 1941 |
| 2,257,472 | McGrath | Sept. 30, 1941 |
| 2,460,497 | Frisk et al. | Feb. 1, 1949 |
| 2,476,017 | Yardeny | July 12, 1949 |
| 2,492,745 | Hammes | Dec. 27, 1949 |
| 2,502,023 | Persons | Mar. 28, 1950 |
| 2,577,483 | Roosdorp | Dec. 4, 1951 |